(No Model.)  4 Sheets—Sheet 4.
J. R. PILE.
HARROW.
No. 353,001. Patented Nov. 23, 1886.
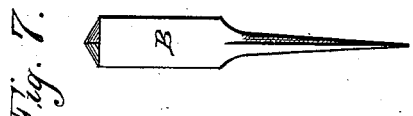
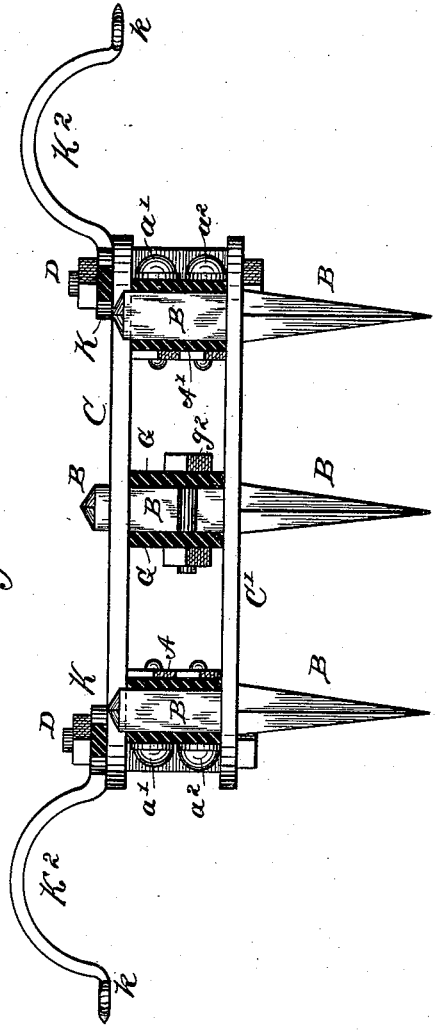
Witnesses
John C. Miller,
Percy White.
Inventor
John R. Pile.
By his Attorney
E. H. Gelston.

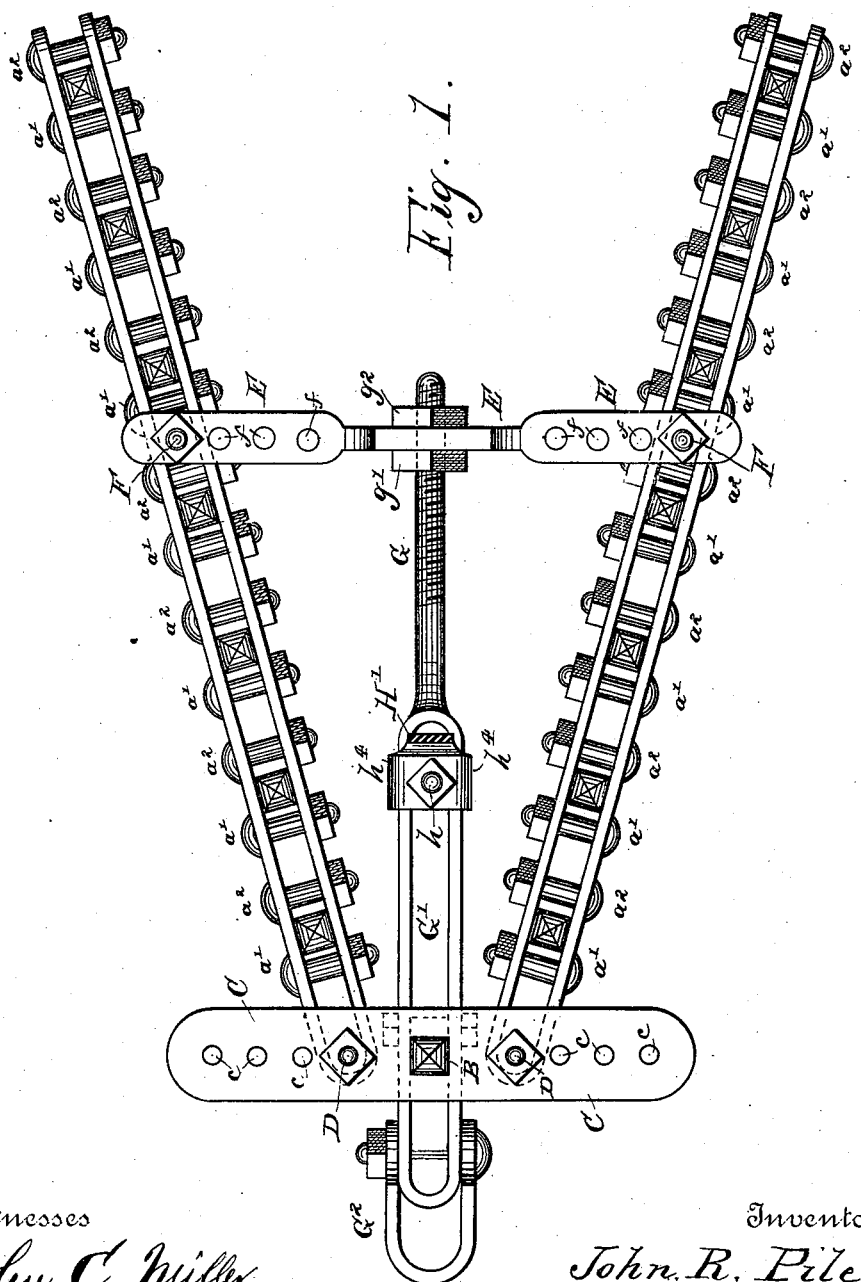

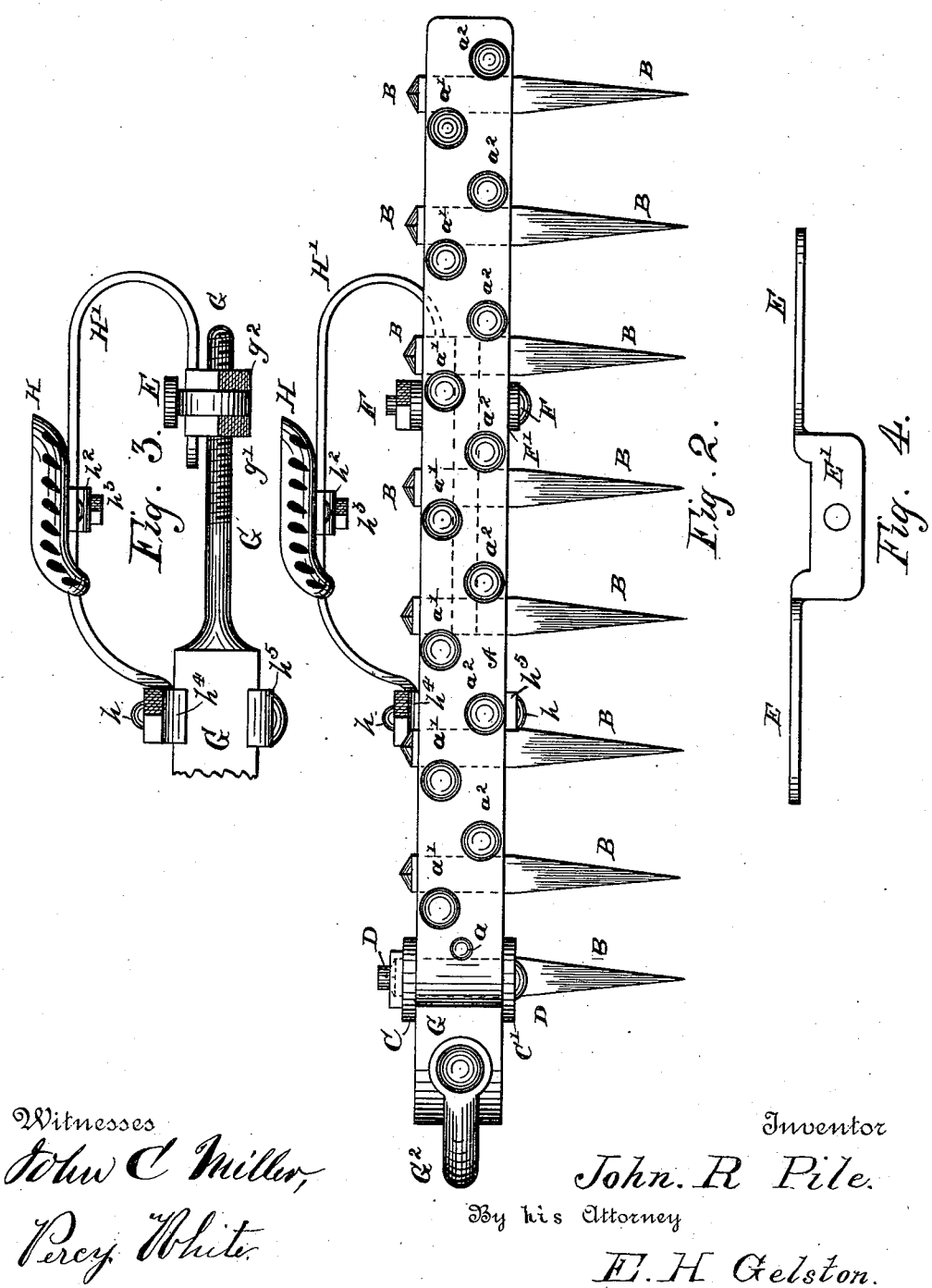

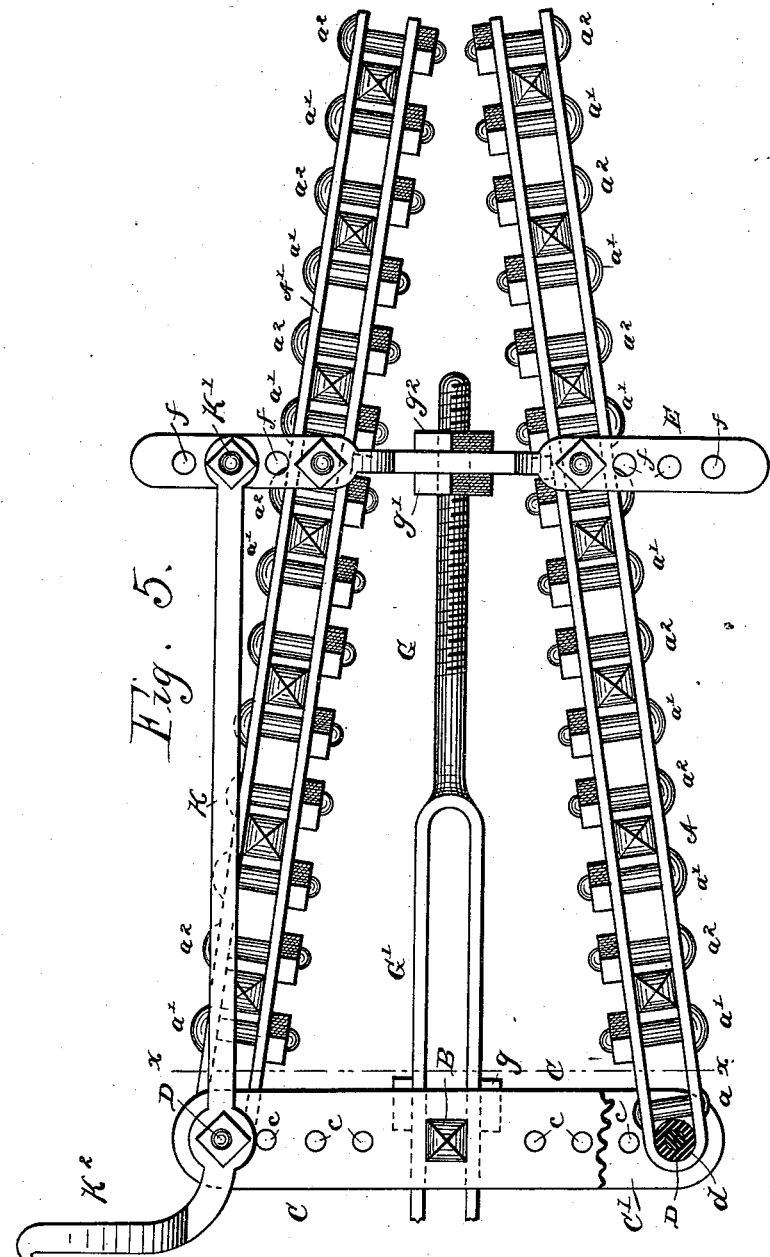

UNITED STATES PATENT OFFICE.

JOHN REID PILE, OF LIVERMORE, KENTUCKY.

HARROW.

SPECIFICATION forming part of Letters Patent No. 353,001, dated November 23, 1886.

Application filed July 31, 1886. Serial No. 209,660. (No model.)

*To all whom it may concern:*

Be it known that I, JOHN REID PILE, a citizen of the United States, residing at Livermore, in the county of McLean and State of Kentucky, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this improvement is a harrow having a frame that can be adjusted in a manner to adapt the implement to operating on a wide surface, and that can be reversely adjusted and adapted to harrowing between rows of growing plants. These results are attainable by the mechanism illustrated in the drawings herewith filed as part hereof, in which the same letters of reference denote the same parts in the different views.

Figure 1 is a plan, partly in section and with parts removed, representing a harrow embodying the features of my improvement. Fig. 2 is a side elevation with parts removed, that are fully shown in other figures. Fig. 3 is a longitudinal vertical sectional elevation representing parts detached. Fig. 4 is a front elevation of one of the parts detached. Fig. 5 is a plan view with parts removed and broken away, and showing the parts adjusted in a manner adapting the implement to harrowing between growing plants. Figs. 6 and 7 represent a modification of the harrow-teeth. Fig. 8 is a transverse vertical section taken on the line $x$ $x$ of Fig. 5.

A A' are the tooth-frames, made of thin wrought-iron plates, bent, as shown in Figs. 2 and 5, and transversely connected adjacent to the bend by a rivet, $a$, for a purpose hereinafter set forth. The frames A A' are provided with a series of transverse perforations for the reception of bolts $a'$ $a^2$, by means of which the parts of the frames are drawn together and made to firmly secure the positions of the harrow-teeth B B, which are of ordinary construction. By reason of the bend at the front end of the tooth-frames they are adapted to receive a sleeve, $d$, by means of which and a bolt, D, inserted through the sleeve $d$, the tooth-frames A A' are pivotally secured to transverse plates C C', which are provided with a series of corresponding perforations, $c$ $c$, for a purpose hereinafter set forth. The rivet $a$, connecting the parts of the tooth-frames adjacent to the sleeves $d$, will prevent the frames from changing their relative positions to each other and to the pivot-bolts D D, by means of which they are secured to the plates C C'.

E is a bar provided with a series of perforations, $f$, and connected to the tooth-frames A A' by means of bolts F, which are set through washers at the lower edges of the tooth-frames, through the space between the harrow-teeth and through the perforations in the bar E, and, by being screwed tight, firmly bind the parts together and brace the positions of the frames, as shown.

G G' is a central draft-bar. It is connected with the transverse plate E by its rounded and screw-threaded part G, which is inserted in a perforation, E', of the plate E when the nuts $g'$ $g^2$ on the draft-bar are set against the plate E, and the connection thereby secured. The tooth-frames may be adjusted and held at a wider divergence by detaching the plate E from the tooth-frames, and moving the same nearer to the transverse plate C C'.

By reason of the spaces in the tooth-frames between the teeth, through which the bolts F F may be inserted, and the series of perforations in the plate E, the harrow may be given a number of different adjustments, and thereby adapted to various conditions of soil and agricultural purposes. As the plate E is moved forward the nuts $g'$ $g^2$ are correspondingly adjusted, and firm connection of plate and central draft-bar thus maintained. The bifurcated or slotted part G' of the draft-bar is adapted to receive a bolt, $h$, which passes through a flanged washer, $h^5$, at the lower edge thereof, and secures the position of a spring-plate, H', which it connects with the draft-bar through its flanged end $h^4$.

H is a driver's seat, adjustably secured to the spring-plate H' by a plate, $h^2$, transversely connected to the lower part of the seat, over the plate H'. The transverse plate $h^2$ is provided with a set-screw, $h^3$, by means of which the seat may be secured in any position to which it may be adjusted on the plate H'. When the tooth-frame transverse connecting-plate E is moved forward as occasion may require, the bolt h may be loosened and the plate H' moved forward in order that its curved part may have a bearing on the transverse plate E, and the seat H may be adjusted rearward or otherwise, as may be deemed advisable for comfort or utility.

The central draft-bar is provided with a clevis, G², adapted to connection with either a single or double tree, and corresponding attachment of the implement to a single draft animal or double team.

K K are draft-bars bolted to the implement through perforations corresponding to those in the transverse connecting-plates E and C C'. The draft-bars K are provided with arcs K' at their front ends, for a purpose hereinafter explained.

By reason of the different perforations in the transverse plates E and C C' the tooth-frames A A' may be drawn together at their rear ends and moved apart at their front ends, and secured in such adjusted positions, substantially as shown in Fig. 5, and the implement thereby adapted to harrowing the ground between rows of growing plants.

By reason of the central draft-bar, G G', and the side draft-bars, K K', either two, three, or four draft animals may be hitched to the implement when used either at a wide or narrow adjustment of the parts. By reason of the side draft-bars, K K', three draft animals may be hitched to the implement when it is adjusted, as shown in Fig. 5, for harrowing between rows of growing plants, and, if deemed advisable, two draft animals only can be used by hitching the same to the side draft-bars, K K'. They can travel between the plant-rows at the opposite sides of the harrow. The driver's seat may be adjusted on the bar H' to the position best adapted to guiding the team or weighting the harrow, or both. By reason of the reverse adjustment of the harrow, as shown in Fig. 5, the narrowest part of the implement will be behind the driver, and the widest part will be in his front, and the implement for that reason can be guided between the rows in a manner to prevent injury to the plants, as any variation of the rear or narrow part of the implement could not be sufficient to affect the plants when the front or widest part was properly directed. By the adjustment shown in Fig. 5, adapting the implement for use between the plant-rows, the teeth B would be brought in such relative positions to the soil that the latter would be efficiently pulverized by the movement of the implement, and weeds growing between the rows would also be pointedly affected in a manner beneficial to the growth of the plants. The pulverization of the soil by the application of the harrow between the plant-rows would also adapt the same to efficient movement toward the plants by other implements in an easier and more rapid manner than would otherwise be practicable. By using the form of teeth shown in Figs. 6 and 7 the soil would be beneficially affected, and the roots of growing weeds or other undesirable vegetation would be cut, and the growth thereof either ended or effectually retarded. When the implement is adjusted for use between the plant-rows, the arches of draft-bars K will clear the plants without affecting the draft unfavorably.

Having explained the features of my improvement, what I claim as new, and desire to secure by Letters Patent, is—

1. The combination of the transverse plates provided with series of corresponding perforations at the front ends of the tooth-frames, the tooth-frames adjustably secured thereto, the adjustable transverse plate bolted to the tooth-frames intermediate of the ends, and the central draft-bar adapted to be longitudinally adjusted in the tooth-frame connecting-plates, substantially as specified.

2. The side draft-bars fixed to the transverse plates connecting the tooth-frames, in combination with the harrow, as and for the purpose set forth.

3. The spring-plate and driver's seat, in combination with the central draft-bar and the transverse plate connected to the tooth-frames intermediate of their ends, substantially as specified, for the purpose set forth.

In testimony whereof I affix my signature in presence of two witnesses.

JOHN REID PILE.

Witnesses:
A. I. MOORE,
G. T. CARY.